US012700200B2

(12) United States Patent
Ghosh et al.

(10) Patent No.: US 12,700,200 B2
(45) Date of Patent: Aug. 4, 2026

(54) IMMERSIVE CONTENT SWITCHING SYSTEM IN WEB-BASED MIXED REALITY APPLICATIONS

(71) Applicant: Lydio LLC, Sheridan, WY (US)

(72) Inventors: Samir Ghosh, Los Altos Hills, CA (US); Richard Blair Chapman, The Woodlands, TX (US); Leo Dastur, Brooklyn, NY (US)

(73) Assignee: Lydio LLC, Sheridan, WY (US)

( * ) Notice: Subject to any disclaimer, the term of this patent is extended or adjusted under 35 U.S.C. 154(b) by 105 days.

(21) Appl. No.: 18/965,649

(22) Filed: Dec. 2, 2024

(65) Prior Publication Data

US 2026/0154911 A1      Jun. 4, 2026

(51) Int. Cl.
*G06T 19/00*      (2011.01)
*G06F 3/01*      (2006.01)
(52) U.S. Cl.
CPC ............ *G06T 19/006* (2013.01); *G06F 3/014* (2013.01)
(58) Field of Classification Search
None
See application file for complete search history.

(56) References Cited

U.S. PATENT DOCUMENTS

| | | |
|---|---|---|
| 2022/0100270 A1 | 3/2022 | Pastrana Vicente et al. |
| 2022/0335476 A1 | 10/2022 | Abdel-Wahab et al. |
| 2023/0251919 A1 | 8/2023 | Wang et al. |
| 2023/0258934 A1* | 8/2023 | Chang .................. G02B 27/017 345/8 |
| 2024/0112409 A1 | 4/2024 | Cross et al. |
| 2024/0152244 A1 | 5/2024 | DeDonato et al. |

OTHER PUBLICATIONS

Chen Ji, et al., The Cuteness Factor: An Interpretive Framework for Artists, Designers and Engineers, p. 2509-2521; DIS '23, Jul. 10-14, 2023, Pittsburgh, PA, USA; ACM ISBN 978-1-4503-9893-0/23/07. https://doi.org/10.1145/3563657.3596035.
Elizabeth Childs, et al., Purposeful XR: Affordances, Challenges, and Speculations for an Ethical Future, CHI EA '25, Apr. 26-May 1, 2025, Yokohama, Japan, ACM ISBN 979-8-4007-1395-8/25/04, https://doi.org/10.1145/3706599.3706739.

(Continued)

*Primary Examiner* — Yanna Wu
(74) *Attorney, Agent, or Firm* — Batt IP A Law Corporation; Richard Batt

(57)      ABSTRACT

A method for switching content and immersive environments in cross-platform web-based mixed reality applications. User input data is evaluated for activating a first user cue, optionally in the shape of ring. The first cue is displayed in the immersive content. As the first cue is displaying, the user input data is further evaluated for detecting a directive indicative of the user's intent to switch immersive content. The invention is applicable to switching a wide range of types of 3D immersive content including, without limitation, videos, creator content, games, and stores. Related systems are also described.

20 Claims, 10 Drawing Sheets

(56) References Cited

OTHER PUBLICATIONS

Michael Lankes, et al, Eye Ball: Gazing as a Dilemma in a Competitive Virtual Reality Game; CHI EA '24, May 11-16, 2024, Honolulu, HI, USA; ACM ISBN 979-8-4007-0331-7/24/05, https://doi.org/10.1145/3613905.3650876.

Samir Ghosh, et al., Designing Shared VR Tools for Spatial Scientific Sensemaking About Wildfire Evacuation; CHI EA '24, May 11-16, 2024, Honolulu, HI, USA; ACM ISBN 979-8-4007-0331-7/24/05; https://doi.org/10.1145/3613905.3650819.

* cited by examiner

250

260

270

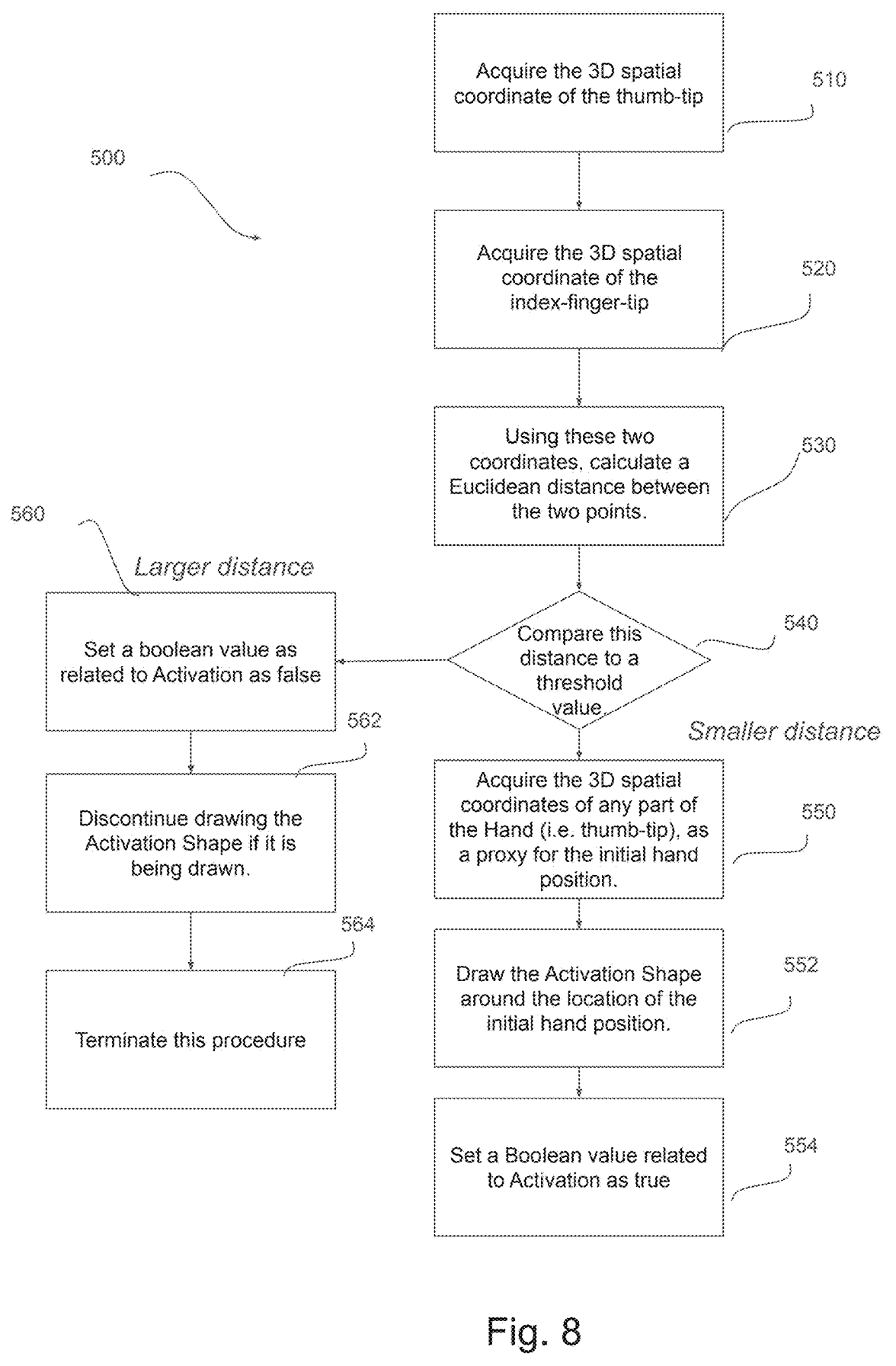

500

Acquire the 3D spatial coordinate of the thumb-tip — 510

Acquire the 3D spatial coordinate of the index-finger-tip — 520

Using these two coordinates, calculate a Euclidean distance between the two points. — 530

560

*Larger distance*

Set a boolean value as related to Activation as false

Compare this distance to a threshold value — 540

*Smaller distance*

562

Discontinue drawing the Activation Shape if it is being drawn.

Acquire the 3D spatial coordinates of any part of the Hand (i.e. thumb-tip), as a proxy for the initial hand position. — 550

564

Terminate this procedure

Draw the Activation Shape around the location of the initial hand position. — 552

Set a Boolean value related to Activation as true — 554

Fig. 8

IMMERSIVE CONTENT SWITCHING SYSTEM IN WEB-BASED MIXED REALITY APPLICATIONS

TECHNICAL FIELD

This generally relates to mixed reality head mounted devices, and more particularly to managing content in web-browser based applications in the head mounted devices.

BACKGROUND

A head-mounted display (HMD) is a wearable device that provides visual information directly to the user's eyes. Examples of HMD include Apple Vision Pro manufactured by Apple Inc. (Cupertino, California) and Meta Quest manufactured by Meta Inc. (Menlo Park, California). A popular use of HMDs is to provide a 3D immersive or extended reality (XR) environment.

XR exists on a spectrum, ranging from fully physical reality (like the world we see around us) to fully virtual reality (completely computer-generated environments). In between, there is augmented reality (AR), where digital elements are overlaid onto the real world, and MR, which blends both seamlessly. To interact with content in such immersive applications, HMD devices commonly provide controller or hand-based ways of interacting with a virtual environment.

With reference to FIGS. 1, and 2A-2E, an established XR application 10 is shown for playing videos using a video player.

Typically, per step 20 of FIG. 1 and the illustration shown in FIG. 2A, a user 12 launches a web browser window 14 and navigates to a website for the immersive video content.

Per step 30 of FIG. 1 and the illustration shown in FIG. 2B, the user selects and activates a button of the controller 32 to launch an immersive environment such as, for example, a WebXR-created video player. WebXR is a set of standards and technologies that enable XR within web browsers. The WebXR Device API allows web content and apps to interface with HMD hardware.

Per step 40 of FIG. 1 and the illustration shown in FIG. 2C, the user is presented with a grid of thumbnails representing different videos. The arrangement of the thumbnails is based on a pre-set grid template arranged on a virtual wall.

Per step 50 of FIG. 1 and the illustration of FIG. 2D, the user selects a video for playback by pointing to a thumbnail 52 and pushing the controller button.

Per step 60 of FIG. 1 and illustration of FIG. 2E, during playback, the user may be presented with a video control menu 62 operable to rewind, fast forward, stop and start. The video control menu 62 is initially generated according to a predetermined algorithm unrelated to the location of the controller and interferes (e.g., obstructs) with the visibility of the immersive content. Additionally, the menu may be beyond the reach of the user (i.e., greater than an arm's length from the user's hand).

Per step 70 of FIG. 1 and the illustration of FIG. 2E, during playback, the video control menu 62 can be operable to show a panel 64 of subsequent video thumbnails from which the user may select or exit the current video per step 80. The panel 64 is initially generated according to a predetermined algorithm and interferes (e.g., obstructs) with the visibility of the immersive content.

There are a number of shortcomings with the above described approaches. First, presenting grids and menus during playback of the immersive content is undesirable because it interferes with the instant video. Second, being required to shift attention from the immersive video to the thumbnail video grid is undesirable. Third, navigating to a separate menu or grid is slow. Fourth, there is no option to quickly switch to a new modality such as a game, store, or another video sequence. Fifth, use of grids in 3D immersive environments can be uncomfortable for causing discomfort or worse, motion sickness. Sixth, navigating multiple different menus and panels can be complex in the 3D immersive environment. Seventh, navigating a grid of videos undesirably increases the amount of time between user views. Eighth, being limited to one HMD platform (e.g., either the hand controller or hand gesture) is undesirable. This poses a particular difficulty for WebXR players, when the similar interface designs need to be provided across these platforms.

Accordingly, a method and system that addresses the above-mentioned challenges is desired.

SUMMARY OF THE INVENTION

An embodiment of the invention is a method for switching from a first type of immersive content to a second type of immersive content in a 3D-environment application in a head mounted display (HMD). For embodiments, the method comprises: receiving user input corresponding to at least one of a controller input and a hand tracking data of a user; evaluating the user input for activating; wherein, if activating is detected, then computing 3D spatial coordinates of a first cue in the first type of immersive content based on an initial hand position of the user; displaying, the first cue in the first type of immersive content during activating; determining a type of directive from a plurality of types of directives based on comparing a 3D location of the current hand position to the initial hand position while the first cue is displaying; generating and indicating a second cue for the user if a directive is detected; and switching from the first type of immersive content to the second type of immersive content based on the type of directive detected.

In embodiments of the invention, the 3D-environment application is a video player, and the first immersive content is a video.

In embodiments of the invention, a first type of directive switches from an nth video to an n−1 or n+1 video in a first sequence of videos.

In embodiments of the invention, a second type of directive switches from the first sequence of videos to a second sequence of videos.

In embodiments of the invention, a third type of directive switches between a video-based modality to a second type of modality. The first cue is a geometric shape, optionally, a ring shape.

In embodiments of the invention, the first type of directive comprises upward motion relative to the first cue.

In embodiments of the invention, the step of evaluating for a type of directive comprises acquiring current 3D spatial coordinates of the position of the controller, calculating a Euclidean distance between the current 3D spatial coordinates and the initial hand position, and comparing the Euclidean distance with a directive threshold value.

In embodiments of the invention, the switching comprises sending a request to a web-connected remote server for obtaining a next video, creator content, game or store.

In embodiments of the invention, the second cue is haptic-based.

In embodiments of the invention, the determining step is performed without a subsequent button press or gesture (vs. ray casting, one points ray and then pushes button to confirm).

In embodiments of the invention, the first cue excludes text and buttons.

In embodiments of the invention, the first cue disappears when activation ends.

In embodiments of the invention, a circular ring corresponding to the first cue disappears when a button on the controller for activation is released.

In embodiments of the invention, the first cue is an internal-type cue generated relative to the location of user's body or hand and presented in the vicinity of a user's hand and not based on external pre-set or default-type visual arrangements of user selectable items.

In embodiments of the invention, a system for switching from a first immersive content to a second immersive content in a 3D-environment application in a head mounted display (HMD). For embodiments, the system comprises: a switch server programmed and operable to: receive user input corresponding to at least one of a controller input and a hand tracking data of a user; evaluate the user input for activating, wherein, if activating is detected, then compute 3D spatial coordinates of a first cue in the first type of immersive content based on an initial hand position of the user; instruct the HMD to display the first cue in the first type of immersive content during activating; determine a type of directive from a plurality of types of directives relative to the first cue based on current hand-tracking data of the current hand position while the first cue is displaying; generate a second cue for signaling the user if a first type of directive is detected; and switch from the first immersive content to a second immersive content based on the first type of directive detected.

In embodiments of the invention, the 3D-environment is a video player.

In embodiments of the invention, the first type of directive switches from an nth video to an n−1 or n+1 video in a first sequence of videos.

In embodiments of the invention, a second type of directive switches from the first sequence of videos to a second sequence of videos.

In embodiments of the invention, the switching comprises changing between modalities.

In embodiments of the invention, the first cue comprises a circle, square, rectangle, or star.

In embodiments of the invention, the directive comprises upward motion relative to the first cue.

In embodiments of the invention the evaluating for a type of directive comprises acquiring current 3D spatial coordinates of the position of the controller, calculating a Euclidean distance between the current 3D spatial coordinates and the initial hand position, and comparing the Euclidean distance with a directive threshold value.

In embodiments of the invention, the system further comprises the HMD, and the HMD is programmed and operable to provide the user input to said switch server.

In embodiments of the invention, the system further comprises at least one hand-controller for generating the hand-tracking data.

In embodiments of the invention, the switch server is programmed to, during the switch step, send a request to a web-connected remote content server for obtaining the next video, creator content, game or store.

In embodiments of the invention, the user input comprises detecting hand gestures.

In embodiments of the invention the activating is commenced based on the user pinching their thumb-tip and index-finger-tip together.

In embodiments of the invention the first type of directive is commenced if the user moves their pinched fingers a threshold distance from the initial hand position.

In embodiments of the invention the videos or modalities in a 3D immersive environment without projecting a ray on a wall or screen or tracking eye movement.

In embodiments of the invention a non-transitory machine-readable medium, comprising executable instructions that, when executed by a processing system including a processor, facilitate performance of operations, the operations comprising: receive user input corresponding to at least one of a controller input and a hand tracking data of a user; evaluate the user input for activating; wherein, if activating is detected, then computing 3D spatial coordinates of a first cue in the first type of immersive content based on an initial hand position of the user; display, the first cue in the first type of immersive content during activating; determine a type of directive from a plurality of types of directives based on comparing a 3D location of the current hand position to the initial hand position while the first cue is displaying; generate a second cue for signaling the user if a first type of directive is detected; and switch from the first immersive content to a second immersive content based on the type of directive detected.

In embodiments of the invention a method for switching from a first immersive video to a second immersive video in a 3D-environment video player in a head mounted display (HMD). For embodiments, the method comprises: receiving user input corresponding to a controller input; evaluate the user input for activating; wherein, if activating is detected, then computing 3D spatial coordinates of a first geometrical shape in the first immersive video based on an initial hand position of the user; display, the first geometrical shape in the first immersive video during activating; determine a type of directive from a plurality of types of directives based on comparing a 3D location of the current hand position to the initial hand position while the first geometrical shape is displaying in the first immersive video; generating and indicating a second cue for the user if a directive is detected; and switching from the first immersive video to the second immersive video or to another immersive content modality based on the type of directive detected; and wherein the switching is performed without further pressing a controller button to confirm the directive detected.

An embodiment of the invention is a method or system that, upon receiving a control input (such as a button press or hand gesture) can activate a first cue such as displaying a ring. While the user continuously provides this input, the position of the user's hand is tracked. When the hand moves a set distance from the center, a switch is triggered. The direction of the hand movement determines the type of switch. If the hand moves vertically, the immersive content switches sequentially. If the hand moves horizontally, the environment switches modalities (e.g., to present more information about a content creator, or to present a new set of sequential content).

An embodiment of the invention is a graphical user interface (GUI) implemented in an HMD for 3D space that, upon receiving a control input (such as a button press or hand gesture) can activate a first cue such as displaying a ring. While the user continuously provides this input, the position of the user's hand is tracked by automatically computing a distance from the center of the first cue that the user's hand has moved. When the hand moves a set distance from the center of the first cue, a switch is triggered. In embodiments, the direction of the hand movement is automatically computed by a processor, and based on the direction computed, a type of switch is determined. If the hand moves vertically, the immersive content switches sequentially. If the hand moves horizontally, the environment switches modalities (e.g., to present more information about a content creator, or to present a new set of sequential content).

In embodiments, the invention recites elements and steps in a specific manner for automatically displaying cues to the user based on timing, computed distance and direction which provides a specific improvement over prior systems, resulting in an improved user interface for such electronic devices.

Objects and Advantages

Embodiments of the invention have a variety of objects and advantages.

In embodiments, an object the invention is to provide a method and system by which a web browser-based application containing an immersive video player can provide convenient interfaces that permit a user to switch between a sequential set of videos and modalities.

In embodiments, an object of the invention is to provide a method permitting users in WebXR applications to switch between a sequential set of videos and modalities.

In embodiments, an object of the invention is to avoid requiring a user to navigate a grid of content or environments within WebXR applications.

In embodiments, an object of the invention is to enable a user to be able to immediately switch to new content with minimal visual interruption, to not incur as much motion sickness (e.g., due to the proprioception of a hand movement during an environment switch), and to communicate how the user moves within a set of content or between modalities based on the directionality of hand movement.

In embodiments, an object of the invention is to switch videos or modalities in a 3D immersive environment using cues generated based on (or adaptive to) the user's initial hand position, and not automatically displayed in a predetermined arrangement or location external or outside of the initial hand position.

In embodiments, an object of the invention is to switch videos or modalities in a 3D immersive environment based on computing a vector from a current hand position and the initial hand position.

In embodiments, an object of the invention is to switch videos or modalities in a 3D immersive environment without projecting a ray on a wall or screen or tracking eye movement.

In embodiments, an object of the invention is switching videos in a 3D immersive environment based on initially generating a cue relative to the hand of the user—and nearby or within arm's reach of the hand of the user and not based on a predetermined location or out of reach of the user's hand.

In embodiments, an object of the invention is to switch videos or modalities in a 3D immersive environment using text-less and letter-free cueing.

In embodiments, an object of the invention is to require concurrency of user actions such as, when the controller button is released, the first 'activation' cue disappears.

In embodiments, the invention recites elements and steps in a specific manner for automatically displaying cues to the user based on timing, computed distance and direction which provides a specific improvement over prior systems, resulting in an improved user interface for such electronic devices.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 8 is a flowchart of a process for activating a first cue based on a hand gesture in an immersive video content, according to one or more embodiments of the present invention;

DETAILED DESCRIPTION

Before the present invention is described in greater detail, it is to be understood that this invention is not limited to particular embodiments described, and as such can, of course, vary. It is also to be understood that the terminology used herein is for the purpose of describing particular embodiments only, and is not intended to be limiting, since the scope of the present invention will be limited only by the appended claims. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described. It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein are various methods and systems for switching content and immersive environments in cross-platform web-based mixed reality applications.

Figure 3:
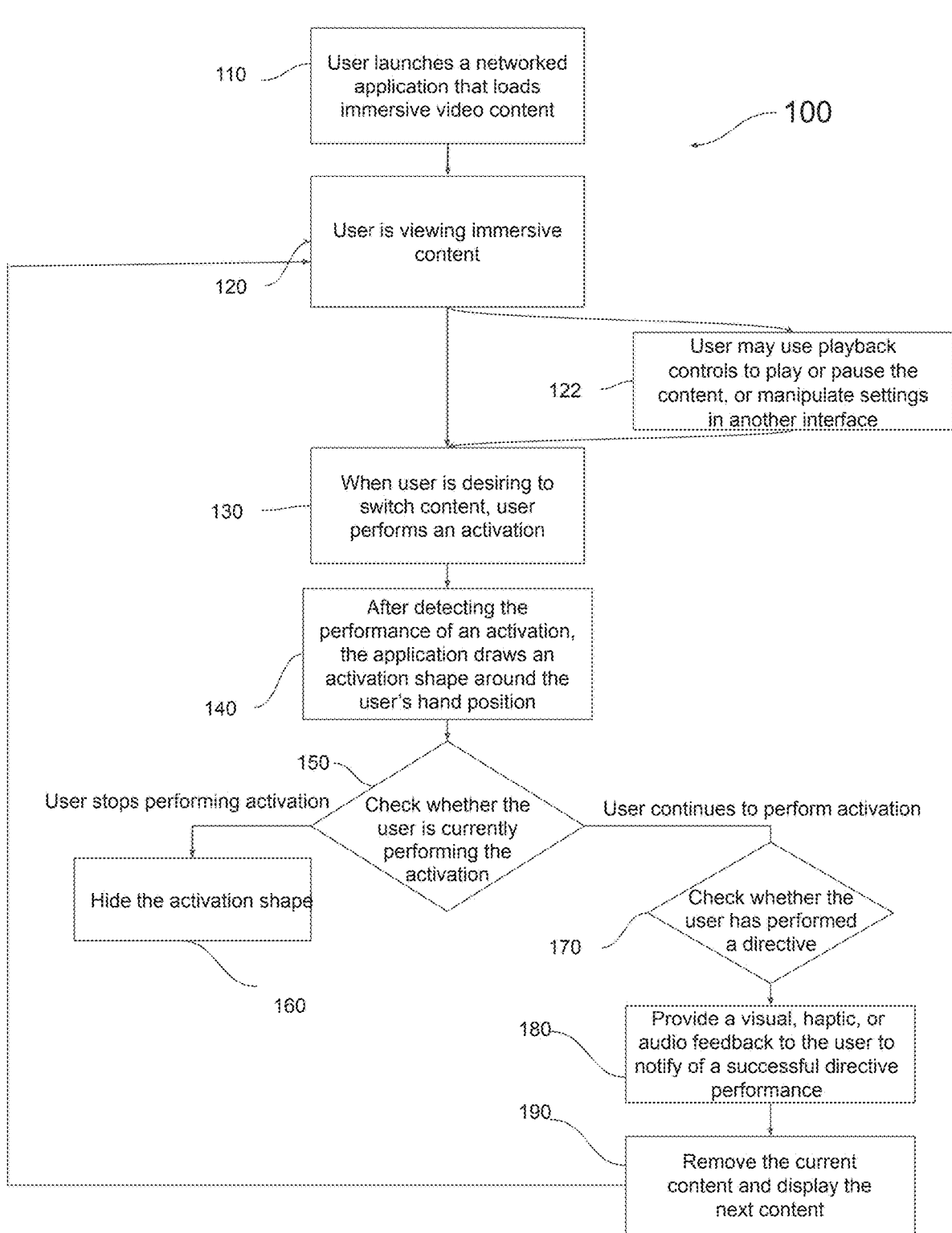
FIG. 3 is a flowchart of an overview process for switching content in an immersive video content, according to one or more embodiments of the present invention.

FIG. 3 is a flowchart of an overview process 100 for switching content in an immersive video content, according to one or more embodiments of the present invention.

Figure 1:
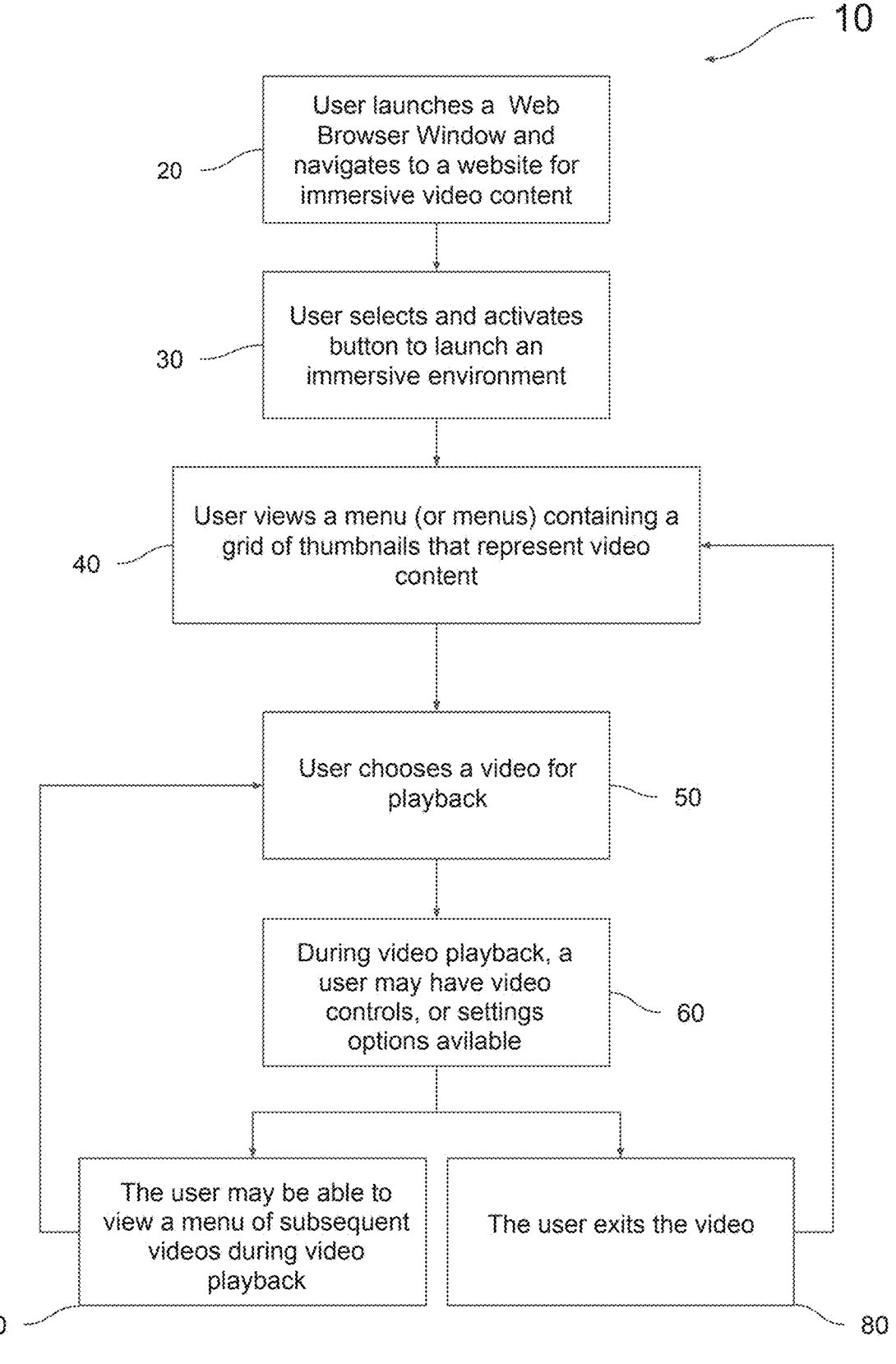
FIG. 1 is a flowchart of a prior art method for selecting a video from a grid in a web-based video player.
Figures 2A, 2B, 2C, 2D, 2E:
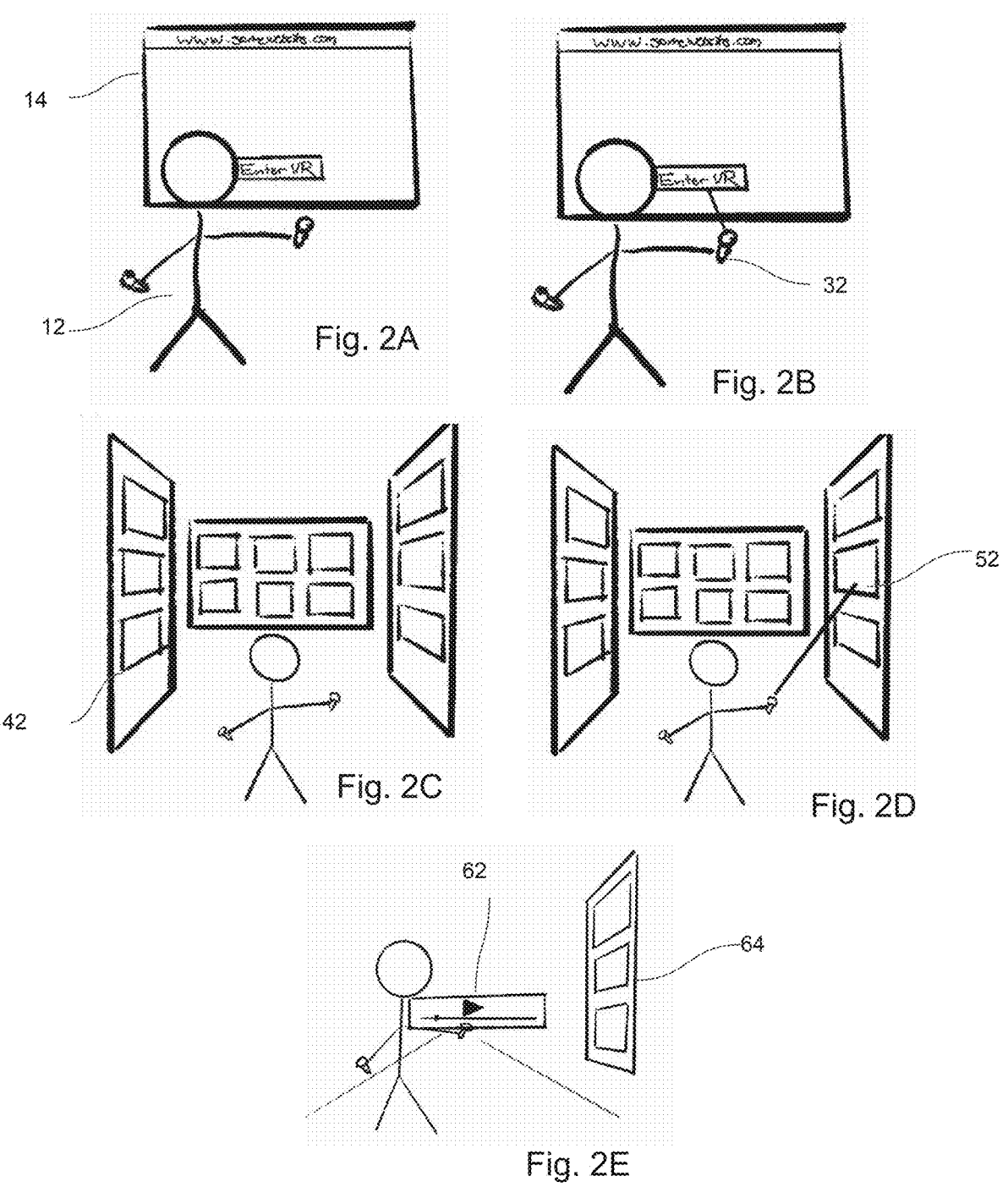
FIGS. 2A-2E are sequential illustrations of a prior art method of a user selecting a video from a grid in a web-based video player.

Step 110 states user launches a network application that loads immersive video content. This step may be performed by opening a WebXR-based video player using a networked HMD, and electing a video, as described above in connection with FIG. 1.

In some implementations, a switcher tool as described herein is loaded as a part, subsystem, or module of the network application, and in some embodiments, it is delivered from a server (whether virtual or otherwise) for execution within the HMD.

Step 120 states user is viewing immersive content. For example, the user may be watching the selected video via the HMD.

Optionally, according to step 122, the user may playback controls to play or pause the content or manipulate settings in another interface.

Step 130 states when the user is desiring to switch content, the user performs an activation with a user input. In embodiments, as described herein, the user input may comprise pressing a button on a hand controller or making a specific hand gesture to perform the activation.

Step 140 states that after detecting the performance of an activation, an activation shape is drawn around the user's current hand position. As described herein, when the activation is commenced, the current hand position is recorded as the initial or starting hand position, and a first cue is displayed in the form of a shape relative to the user's initial hand position. In embodiments, the first cue is in the form of a ring displayed around the user's initial hand position.

Step 150 queries to check whether the user is currently performing the activation. In embodiments, depressing the controller button causes activation. Releasing the button ends activation. If the user stops performing the activation, the activation shape is hidden according to step 160. If the user continues to perform the activation, however, the process further checks whether the user has performed a directive according to step 170, discussed herein.

Next, step 180 states to provide visual, haptic, or audio feedback to the user to notify the user of a successful directive performance. In embodiments, a second cue is generated in the form of, e.g., a ring or vibration or highlight is delivered through the HMD to the user.

Step 190 states to remove the current content and display the next content. In embodiments, this step is performed by switching content based on the type of directive detected, discussed herein.

Figure 4:
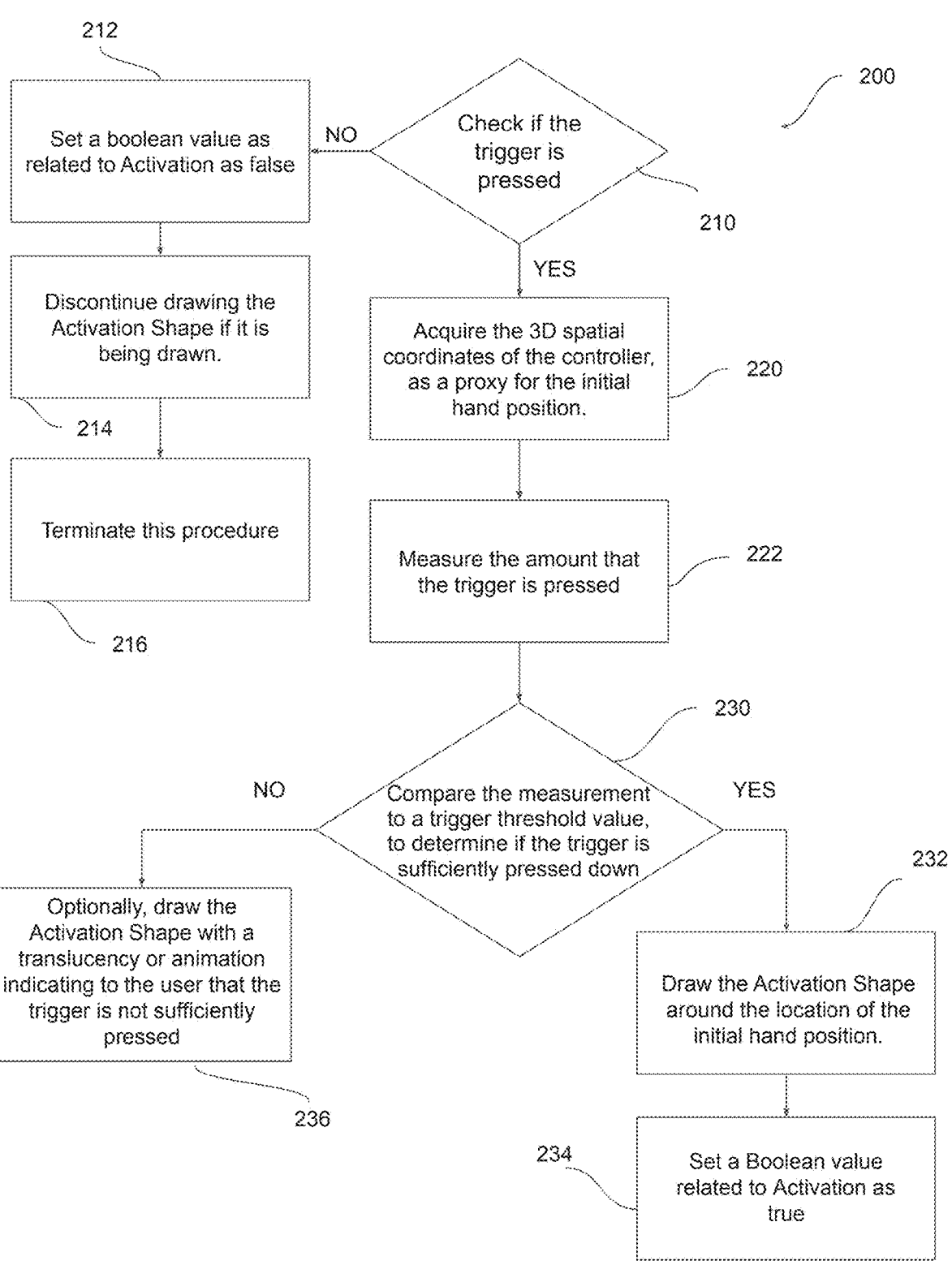
FIG. 4 is a flowchart of a process for activating a first cue based on motion of the hand controller in an immersive video content, according to one or more embodiments of the present invention.

FIG. 4 is a flowchart of a process 200 for activating a first cue based on motion of a hand controller in an immersive video content, according to one or more embodiments of the present invention.

Step 210 states to check or determine whether the trigger of the controller is pressed, which would be indicative of an intent by the user to begin the switching process. If the trigger is pressed at all (i.e., to any degree), the method proceeds to step 220.

Step 220 states to acquire the 3D spatial coordinates of the controller as a proxy for the initial hand position. In embodiments, the 3D spatial coordinates are computed based on image data from cameras in the HMD.

Step 222 states to measure the amount that the trigger is pressed. In embodiments, the controller includes a sensor to measure amount of displacement of the trigger in real time.

Figures 5A, 5B, 5C:
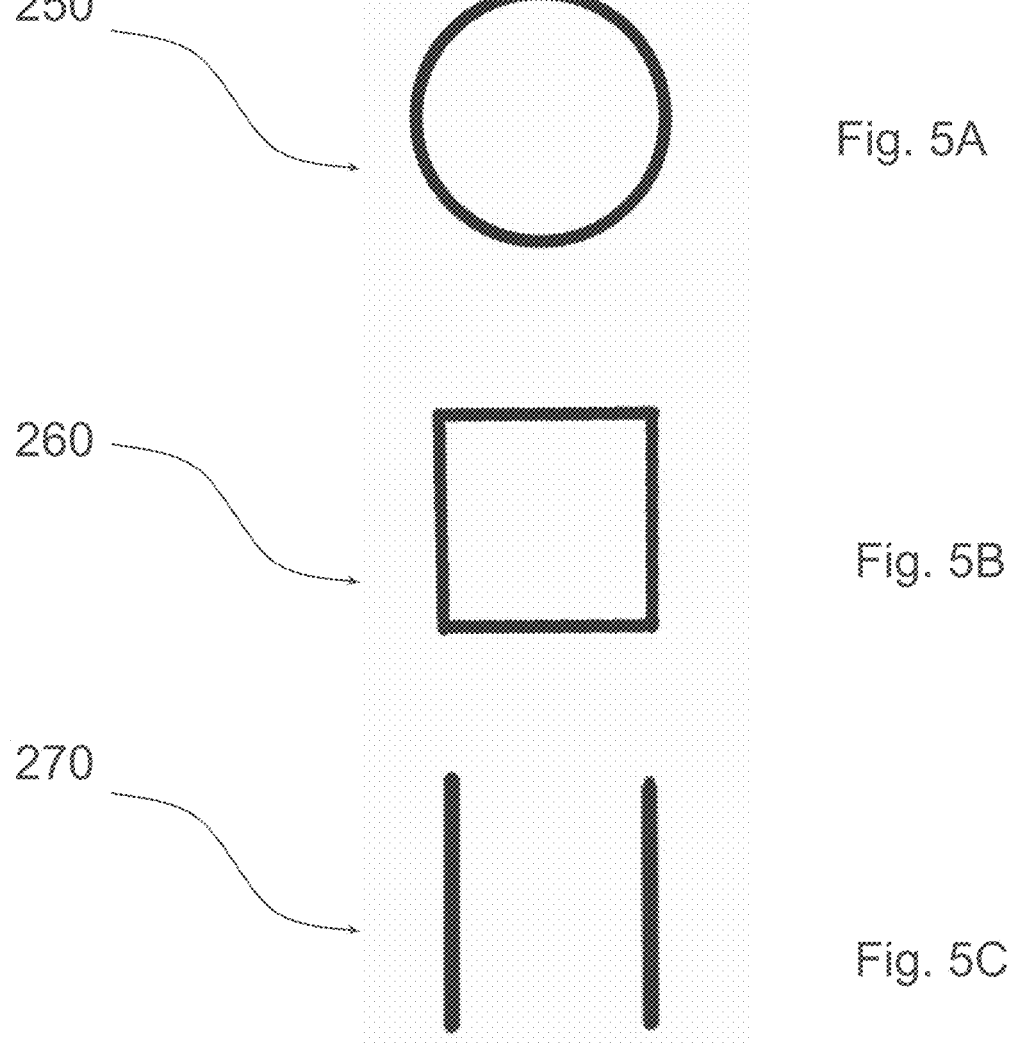
FIGS. 5A-5C are illustrations of different shapes of a first cue, according to one or more embodiments of the present invention.

Step 230 compares the measurement to a trigger threshold value to determine if the trigger is sufficiently pressed down. In embodiments, the threshold value is at least 70% of allowable displacement. If yes, the process moves to step 232, which states to draw the activation shape around the location of the initial hand position. The shape is overlaid on the immersive content. Exemplary shapes for the first activation cue are shown in FIGS. 5A-5C in which FIG. 5A shows a circle 250; FIG. 5B shows a square to 260; and FIG. 5C shows two parallel lines 270.

Now with reference again FIG. 4, step 234 states to set a Boolean value related to the activation as true. As described herein, in embodiments, this Boolean value is used in the directive phase for switching content.

If, on the other hand, at step 230, the measurement does not reach the trigger threshold value, the process moves to step 236.

Step 236 states to draw the activation shape with a translucency or animation indicating to the user that the trigger is not sufficiently pressed. In embodiments, the degree of translucency or animation is proportional to the degree the trigger is depressed.

If, at any time during the activation phase, the trigger is not pressed at all, the method proceeds to step 212 which states to set a Boolean value related to activation as false. The activation shape, or drawing of the activation shape, is discontinued according to step 214 and the procedure is terminated per step 216 until the procedure is repeated. In embodiments, the method returns to step 210 immediately following step 216 to check for whether the trigger is pressed. When the Boolean value is false, or the trigger is not pressed at all, checking per step 210 is repeated periodically or continuously. In embodiments, the steps 210 through 216 are repeated for whether the trigger is pressed multiple times per second until the trigger is pressed in which case the method proceeds to step 220.

Figure 6:
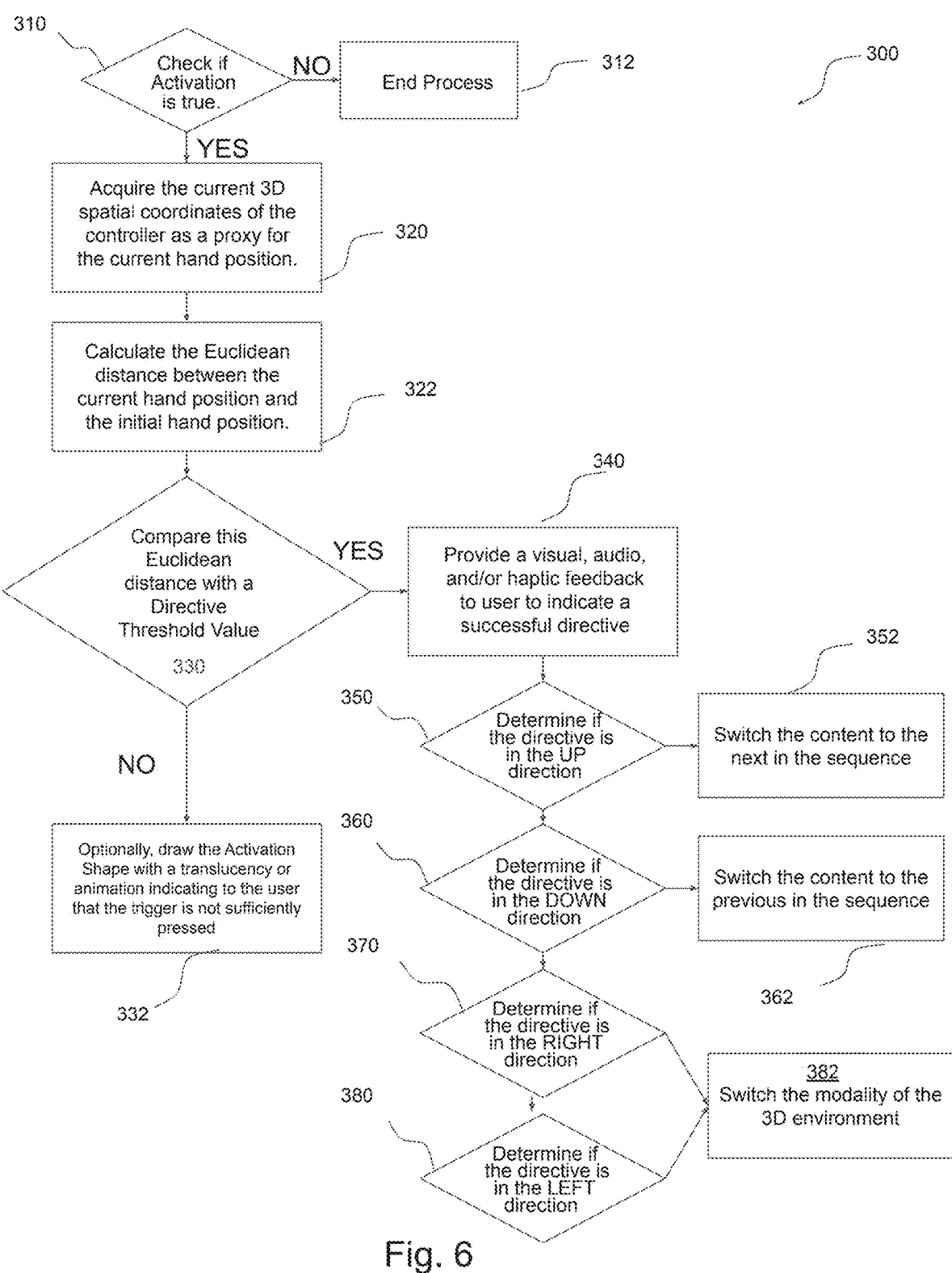
FIG. 6 is a flowchart of a process for evaluating for a directive based on motion of the hand controller in an immersive video content, according to one or more embodiments of the present invention.

FIG. 6 is a flowchart of a process 300 for evaluating for a directive based on motion of a hand controller in an immersive video content, according to one or more embodiments of the present invention.

Step 310 states to check if the activation is true. This step may be performed with reference to the activation phase, and whether trigger was depressed to a sufficient threshold level and the Boolean value set to true. If the Boolean value of activation is not true, the process is terminated per step 312.

If the activation is true, however, the process proceeds to step 320 which states to acquire the current 3D spatial coordinates of the controller as a proxy for the current hand position.

Next, step 322 states to calculate the Euclidean distance between the current hand position and the initial hand position. An illustration of an initial hand position and optional current hand positions are shown in FIGS. 7A and 7B-7E, respectively.

Next, step 330 queries whether the Euclidean distance between the current hand position and the initial hand position exceeds a directive threshold value. An exemplary non-limiting range for the directive threshold value 0.01 to 0.2, more preferably about 0.1 units.

If not, the process proceeds to step 332 which optionally draws the activation shape with a visual effect (e.g., a translucency or animation) indicating to the user that a successful directive was not completed.

If, however, the Euclidean distance is greater than the directive threshold value, the process proceeds to step 340 which states to provide visual, audio and/or haptic feedback to the user to indicate a successful directive.

Figures 7A, 7B, 7C, 7D, 7E:
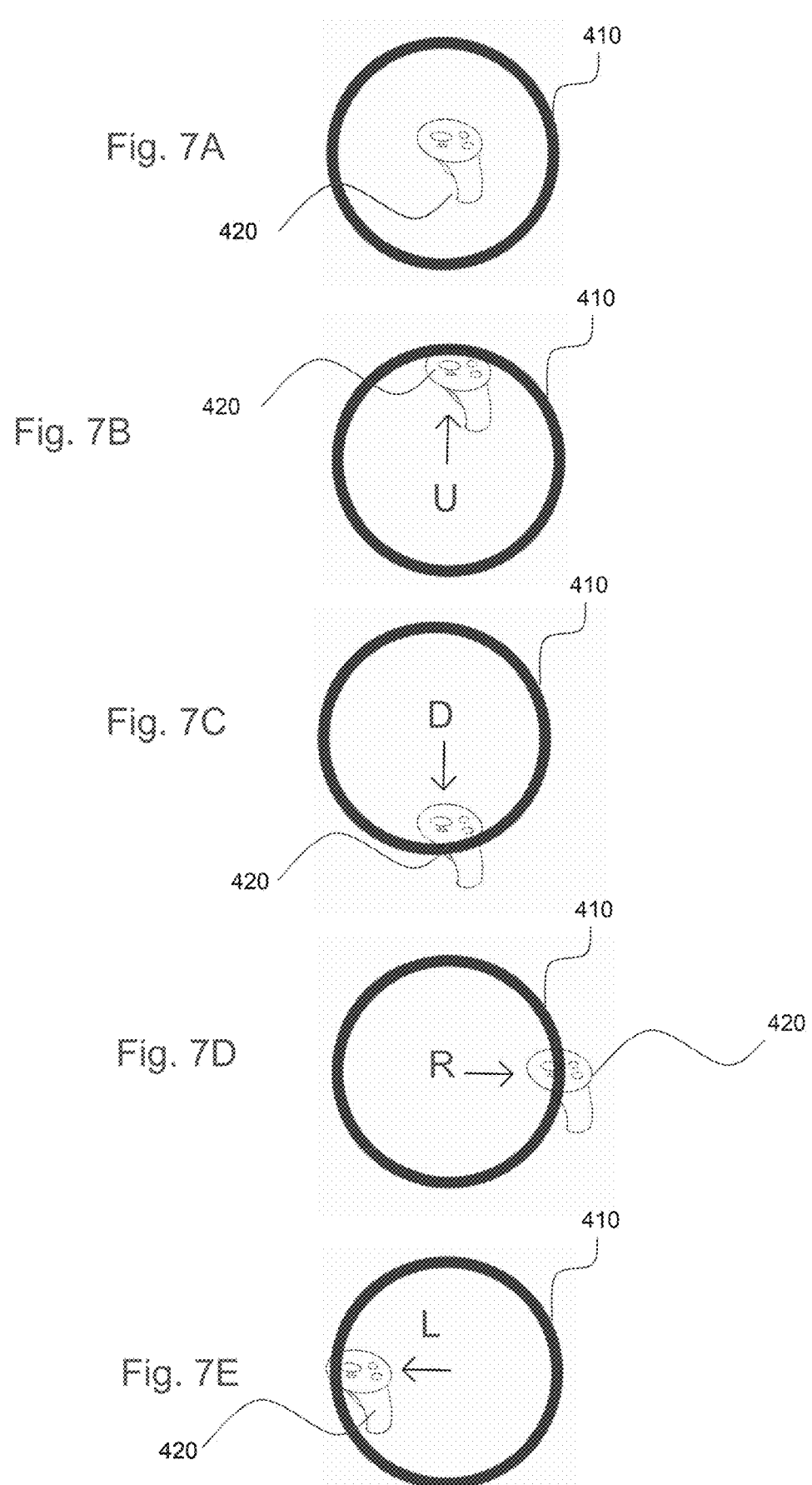
FIGS. 7A-7E are illustrations of different hand controller motions corresponding to different types of directives, according to one or more embodiments of the present invention.

Next step 350 queries whether the directive is in the 'up' direction. A non-limiting exemplary illustration of a displayed activation shape 410 and moving a controller 420 in the up direction (U) is shown in FIG. 7B. If the directive is in the up direction, the process proceeds to step 352, which states to switch the content to the next video in the sequence. If the directive is not in the 'up' direction, the process proceeds to step 360.

Step 360 queries whether the directive is in the down direction. A non-limiting exemplary illustration of a displayed activation shape 410 and moving a controller 420 in the down direction (D) is shown in FIG. 7C. If the directive is in the down direction, the process proceeds to step 362, which states to switch the content to the previous video in the sequence. If the directive is not in the down direction, the process proceeds to step 370.

Step 370 states to determine if the directive is to the right direction. A non-limiting exemplary illustration of a displayed activation shape 410 and moving a controller 420 in the right direction (R) is shown in FIG. 7D. If the directive is to the right direction, the process proceeds to step 382, which states to switch the modality of the 3D environment to another modality different than the current modality. For example, in embodiments, the switch may comprise changing from video content to a store or game. For embodiments, the modality is switched to a profile, to another sequence, to a tutorial or to another interactive interface.

If the directive is not in the right direction, the process proceeds to step 380.

Step 380 states to determine if the directive is to the left direction. A non-limiting exemplary illustration of a displayed activation shape 410 and moving a controller 420 in the left direction (L) is shown in FIG. 7E. If the directive is to the left direction, the process proceeds to step 382 which states to switch the modality of the 3D environment to another type of modality different than the current modality. For example, in embodiments, the switch may comprise changing from video content to a creator content.

FIG. 8 is a flowchart of a process 500 for activating a first cue based on a hand gesture in an immersive video content, according to one or more embodiments of the present invention.

Step 510 states to acquire the 3D spatial coordinate of the thumb-tip. This step may be performed based on receiving user input, and in embodiments, receiving image data from cameras in the HMD. A trained detector algorithm can evaluate the image data to identify and track in 3D space the thumb-tip.

Step 520 states to acquire the 3D spatial coordinate of the index-finger-tip. This step may be performed based image data from cameras in the HMD. A trained detector algorithm can evaluate the image data to identify and track in 3D space the index-finger-tip.

Step 530 states, using these two 3D spatial coordinates, calculate the Euclidean distance between the two points.

Step 540 evaluates the distance calculated in step 530 relative to a threshold value (e.g., 1-5 mm). If the distance calculated in step 530 is less than the threshold value, the process proceeds to step 550, indicating the user's intent to commence the activation phase.

Step 550 states to acquire the 3D spatial coordinates of any part of the hand (e.g., thumb tip) as a proxy for the initial hand position. This step may be performed by the cameras in the HMD, and machine learning software to detect and locate a part of the hand.

Step 552 states to draw the activation shape around the location of the initial hand position. The shape is overlaid on the immersive content. This step may be performed as described above in connection with the hand controller activation shapes except activation is performed by a hand gesture instead of depressing a button on the controller.

Step 554 states to set Boolean value related to activation as true. As described herein, in embodiments, this Boolean value is used in the directive phase for switching content.

If, however, in step 540 the calculated distance exceeds the threshold value, the process proceeds to step 560, indicating the user does not have intention to commence the activation phase.

Step 560 states to set a Boolean value for activation as 'false'.

The activation shape, or drawing of the activation shape, is discontinued according to step 562 and the procedure is terminated per step 564 until the procedure is repeated. In embodiments, the method returns to step 510 immediately following step 564 to check for whether the gesture is sufficient. When the Boolean value is false, or the gesture is insufficient, checking per step 510 is repeated periodically or continuously. In embodiments, the steps 510 through 530 are repeated for whether the gesture is sufficient multiple times per second until the calculated distance is smaller than the threshold value (e.g., the thumb-tip and index-finger-tip are pressed together) in which case the method proceeds to step 550.

Figure 9:
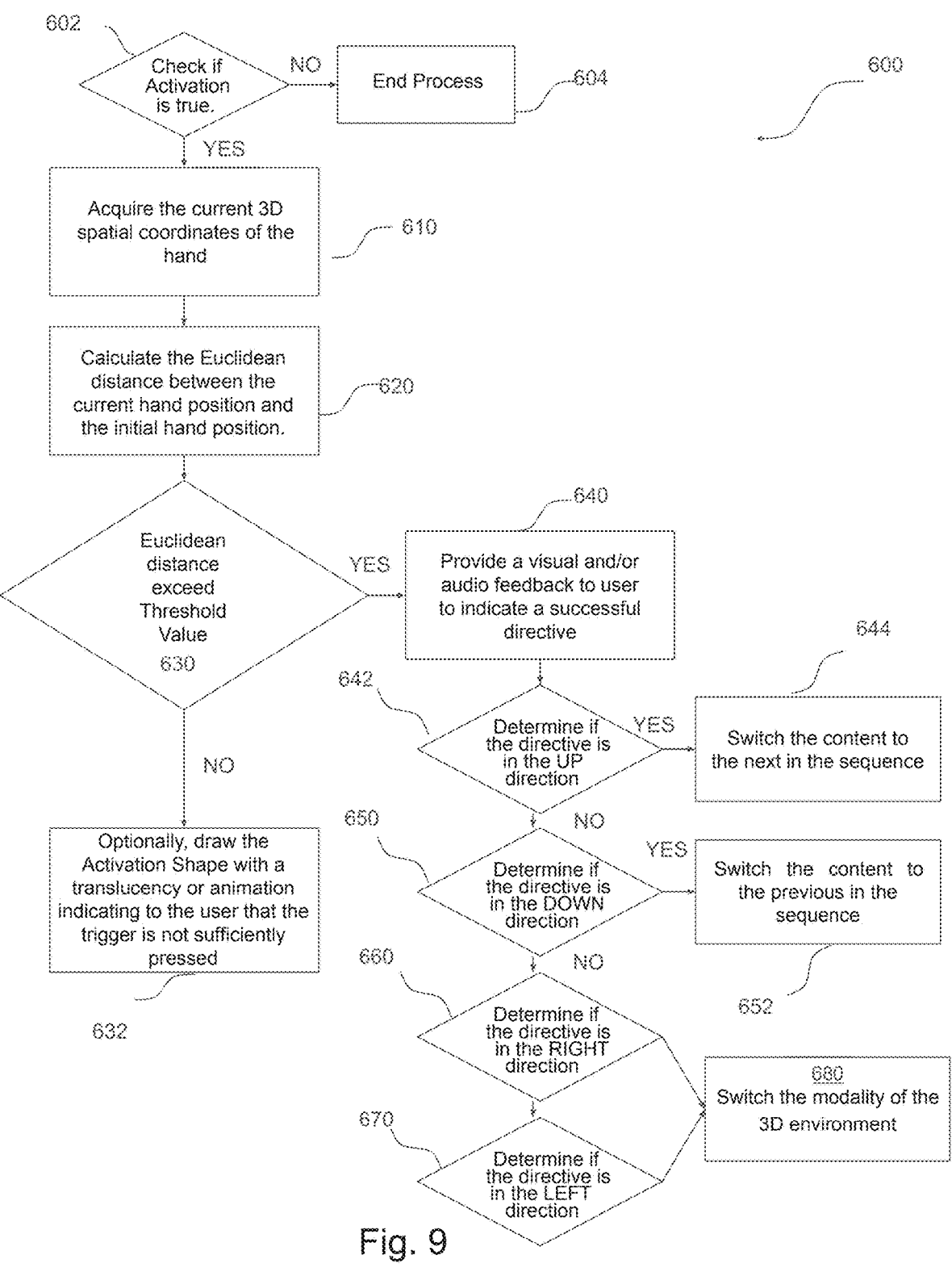
FIG. 9 is a flowchart of a process for evaluating for a directive based on a hand gesture in an immersive video content, according to one or more embodiments of the present invention.

FIG. 9 is a flowchart of a process 600 for evaluating for a type of directive based on a hand gesture in an immersive video content, according to one or more embodiments of the present invention.

Step 602 states to check if the activation is true. This step may be performed with reference to the activation phase, and whether the hand gesture was sufficient (e.g., in embodiments, thumb and fingertip in contact with one another) and the Boolean value set to true. If true, a first cue (e.g., a ring) has been drawn about the initial 3D position of the user's hand. However, if the Boolean value for activation is not true, the method is terminated per step 604.

If the activation is true, the method proceeds to step 610 which states to acquire the current 3D spatial coordinates of the hand. In embodiments, the spatial coordinates of the hand are obtained by cameras in the HMD.

Next, step 620 states to calculate the Euclidean distance between the current hand position and the initial hand position.

Next, step 630 queries whether the Euclidean distance exceeds a directive threshold value. If not, the process proceeds to step 632 which optionally draws the activation shape with a visual effect (e.g., a translucency or animation) indicating to the user that the gesture is insufficient to create a successful directive.

If, however, the Euclidean distance is greater than the directive threshold value, the process proceeds to step 640 which states to provide visual, audio and/or haptic feedback to the user to indicate a successful directive.

Next step 642 queries whether the directive is in the 'up' direction. If the directive is in the up direction, the process proceeds to step 644, which states to switch the content to the next video in the sequence. If the directive is not in the 'up' direction, the process proceeds to step 650.

Step 650 queries whether the directive is in the down direction. If the directive is in the down direction, the process proceeds to step 652, which states to switch the content to the previous video in the sequence. If the directive is not in the down direction, the process proceeds to step 660.

Step 660 states to determine if the directive is to the right direction. If the directive is to the right direction, the process proceeds to step 680, which states to switch the modality of the 3D environment to another modality different than the current modality. If the directive is not in the right direction, the process proceeds to step 670.

Step 670 states to determine if the directive is to the left direction. If the directive is to the left direction, the process proceeds to step 680 which states to switch the modality of the 3D environment to another type of modality different than the current modality.

Figure 10:
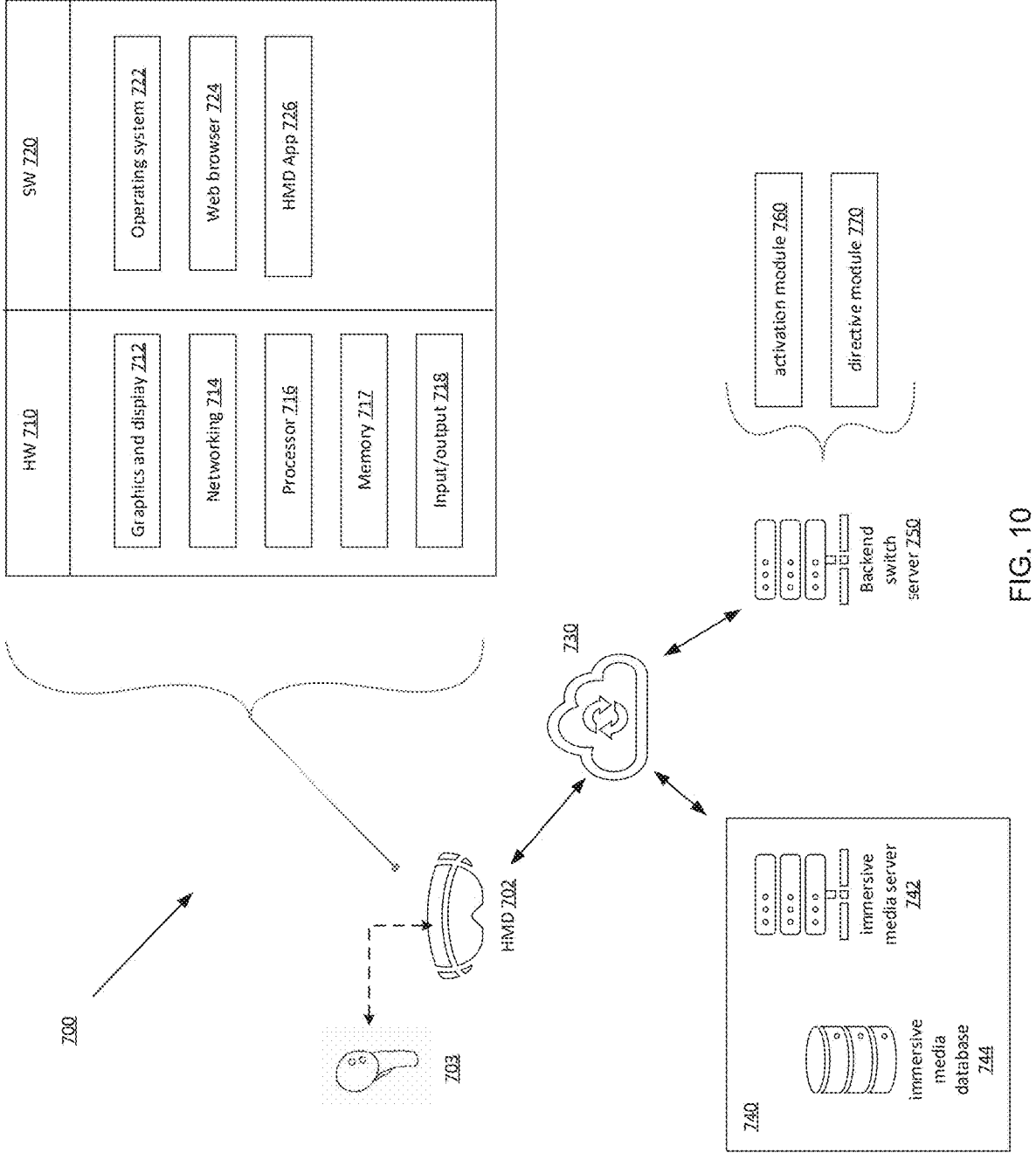
FIG. 10 is a schematic diagram of a system that can implement techniques described herein, according to one or more embodiments of the present invention.

FIG. 10 is a schematic diagram of an HMD system 700 operable with a network-based application to switch between videos in a sequence or between modalities in a 3D immersive environment, according to one or more embodiments of the present invention.

HMD system 700 is shown including a head mounted display 702 connected via the internet 730 to a remote immersive media platform 740 and backend switch server 750.

HMD 702 itself is shown including hardware 710 and software 720.

Exemplary hardware 710 includes without limitation graphics and display 712, networking interface 714, a processor 716 and memory 717, and various input and outputs 718. In some embodiments, hardware includes built-in cameras for computing hand gestures as described herein. In some embodiments, inputs include tracking information or signals from a hand controller 704 held by the user. For example, a transponder/receiver in the hand controller and HMD are operable to determine 3D spatial coordinates of the hand controller relative to the display.

Exemplary software 720 includes HMD firmware and operating system software 722, a web browser 724, and typically an HMD App provided by the manufacturer for the particular HMD.

Non-limiting examples of HMDs are the Apple Vision Pro manufactured by Apple Inc. (Cupertino, California), HTC Vive manufactured by HTC Corporation (Berkeley, California), and Meta Quest manufactured by Meta Inc. (Menlo Park, California).

Immersive media platform 740 is shown including an immersive media server 742 and media database 744. The immersive media server may host a 3D immersive media player website or Application such a video player to provide 3D immersive content (e.g. 3D-immersive videos) to the HMD across the internet 730 based on a request from the web browser 724 of the HMD. A wide range of immersive media players and apps are available. Many are developed based on the WebXR protocol for immersive video content. It is therefore desirable and an object of some embodiments of the invention to be operable with such immersive media video players, and those built on the WebXR protocol.

Backend switch server 750 is shown including an activation module 760 and directive module 770. In embodiments, the activation and directive modules are software on a cloud server or virtual server or machine.

As described herein, the activation module 760 is received by the HMD through the internet 730 and is operable by a web browser that supports WebXR to generate and display a first cue (namely, activation shape) within the current immersive content via the HMD based on the user's hand controller motion.

As described herein, the directive module 770 is received by the HMD through the internet 730 and is operable by a web browser that supports WebXR to evaluate for switching videos or content within the current immersive content based on the user's hand controller motion relative to the first cue.

In embodiments, the modules are programmed and operable to operate through the internet as a stand-alone App or progressive App in which the user may activate an icon in the GUI of the HMD to load the switcher and content without use of a web browser.

Alternative Embodiments

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques.

For example, although embodiments of the invention have been described in the context of displaying WebXR videos, it could be used for navigating between immersive experiences such as creator content, games or stores.

Additionally, although embodiments of the invention have been described in the context of operating with a hand controller, it could be used for switching based on hand gestures in the absence of a hand controller.

Additionally, embodiments can include various operations as set forth above, fewer operations, or more operations; or operations in another order than that specifically described above. Additionally, any of the components and steps described herein may be combined with one another in any logical manner except where such components or steps would be exclusive to one another. Accordingly, the scope and spirit of the invention should be judged in terms of the claims, which follow as well as the legal equivalents thereof.

What is claimed is:

1. A method for switching from a first type of immersive content to a second type of immersive content in a 3D-environment application in a head mounted display (HMD), the method comprising:

receiving user input corresponding to at least one of a controller input and hand tracking data of a user;

evaluating the user input for activating; wherein, if activating is detected, then computing 3D spatial coordinates of a first cue in the first type of immersive content based on an initial hand position of the user;

displaying, the first cue in the first type of immersive content during activating;

determining a type of directive from a plurality of types of directives based on comparing a 3D location of the current hand position to the initial hand position while the first cue is displaying;

generating and indicating a second cue for the user if a directive is detected; and switching from the first type of immersive content to the second type of immersive content based on the type of directive detected.

2. The method of claim 1, wherein the 3D-environment application is a video player, and the first immersive content is a video.

3. The method of claim 2, wherein a first type of directive switches from an $n^{th}$ video to an n−1 or n+1 video in a first sequence of videos.

4. The method of claim 3, wherein a second type of directive switches from the first sequence of videos to a second sequence of videos.

5. The method of claim 1, wherein a third type of directive switches between a video-based modality to a second type of modality.

6. The method of claim 1, wherein the first cue is a geometric shape.

7. The method of claim 1, wherein the first type of directive comprises upward motion relative to the first cue.

8. The method of claim 1, wherein the evaluating for a type of directive comprises acquiring current 3D spatial coordinates of the position of the controller, calculating a Euclidean distance between the current 3D spatial coordinates and the initial hand position, and comparing the Euclidean distance with a directive threshold value.

9. The method of claim 1, wherein the switching comprises sending a request to a web-connected remote server for obtaining a next video, creator content, game or store.

10. The method of claim 1, wherein the second cue is haptic-based.

11. The method of claim 1, wherein the determining step is performed without a subsequent button press or gesture.

12. The method of claim 1, wherein the first cue excludes text and buttons.

13. The method of claim 1, the first cue disappears when activation ends.

14. The method of claim 13, wherein a circular ring corresponding to the first cue disappears when a button on the controller for activation is released.

15. The method of claim 1, wherein the first cue is an internal-type cue generated relative to the location of user's body or hand and presented in the vicinity of a user's hand.

16. A non-transitory machine-readable medium, comprising executable instructions that, when executed by a processing system of an HMD including a processor, facilitate performance of operations, the operations comprising:

receive user input corresponding to at least one of a controller input and a hand tracking data of a user;

evaluate the user input for activating; wherein, if activating is detected, then computing 3D spatial coordinates of a first cue in the first type of immersive content based on an initial hand position of the user;

display, the first cue in the first type of immersive content during activating;

determine a type of directive from a plurality of types of directives based on comparing a 3D location of the current hand position to the initial hand position while the first cue is displaying;

generate a second cue for signaling the user if a first type of directive is detected; and switch from the first immersive content to a second immersive content based on the type of directive detected.

17. The non-transitory machine-readable medium of claim 16, wherein the 3D-environment application is a video player, and the first immersive content is a video.

18. The non-transitory machine-readable medium of claim 16, wherein the first cue is an internal-type cue generated relative to the location of user's body or hand and presented in the vicinity of a user's hand.

19. The non-transitory machine-readable medium of claim 16, wherein the evaluating for a type of directive comprises acquiring current 3D spatial coordinates of the position of the controller, calculating a Euclidean distance between the current 3D spatial coordinates and the initial hand position, and comparing the Euclidean distance with a directive threshold value.

20. A method for switching from a first immersive video to a second immersive video in a 3D-environment video player in a head mounted display (HMD), the method comprising:

receiving user input corresponding to a controller input;

evaluate the user input for activating; wherein, if activating is detected, then computing 3D spatial coordinates of a first geometrical shape in the first immersive video based on an initial hand position of the user;

display, the first geometrical shape in the first immersive video during activating;

determine a type of directive from a plurality of types of directives based on comparing a 3D location of the current hand position to the initial hand position while the first geometrical shape is displaying in the first immersive video;

generating and indicating a second cue for the user if a directive is detected; and switching from the first immersive video to the second immersive video or to another immersive content modality based on the type of directive detected; and wherein the switching is performed without further pressing a controller button to confirm the directive detected.

* * * * *